2,792,421
Patented May 14, 1957

2,792,421

CONDENSATION REACTION

Alexander Dalgleish, Bexley, and Richard Norman Lacey, Hull, England, assignors to The Distillers Company Limited, Edinburgh, Scotland, a British company No Drawing. Application August 16, 1954,
Serial No. 450,267

Claims priority, application Great Britain August 21, 1953

2 Claims. (Cl. 260—596)

The present invention relates to the production of ethylidene acetone from acetaldehyde and acetone and is concerned more particularly with improvements in the condensation step. Ethylidene acetone is an important intermediate for the production by hydrogenation of methyl propyl carbinol which itself is used in the manufacture of certain drugs including methylpropylcarbinyl urethane and ethyl $\alpha$-methylbutyl barbiturate.

The production of ethylidene acetone from acetaldehyde and acetone is a known process and proceeds via the alkali-catalysed condensation between the aldehyde and the ketone to produce a hydroxy ketone, called hydracetyl acetone, and the acid-catalysed dehydration of this compound to produce ethylidene acetone. However, numerous side reactions can take place and carefully controlled conditions are necessary if high yields of the desired product are to be obtained. Previously proposed conditions have usually been based on comparatively low temperatures, sometimes as low as —10° C., in combination with alkali metal hydroxide concentrations of the order of 0.1 to 0.5% by weight. Higher temperatures have led to considerable resinification and low yields.

It is a primary object of the present invention to embody a process for the preparation of ethylidene acetone from acetaldehyde and acetone, which process shall be free of the aforesaid defects of low yields and necessity of using inconveniently low temperatures. This object is realized by the present invention, according to which superior yields of ethylidene acetone together with low yields of by-products such as mesityl oxide are achieved by the use of much higher temperatures in the condensation step together with considerably lower alkali concentrations. These conditions also shorten the time necessary for the reaction.

According to the present invention there is provided a process for the production of ethylidene acetone by the alkali metal hydroxide-catalysed condensation of acetaldehyde with acetone under aqueous conditions and the subsequent acid-catalysed dehydration of the hydroacetyl acetone so produced characterised in that the condensation reaction is carried out at a temperature between 40 and 60° C. while the alkali hydroxide content of the reaction mixture is maintained at 0.005 to 0.05% by weight based on the weight of the acetone plus the water.

The most favourable temperatures within the above range are about 50–55° C., that is just below the refluxing temperature of the mixture at atmospheric pressure.

Although the reaction requires equimolar quantities of acetaldehyde and acetone, it is preferred to use a considerable excess of the acetone over the acetaldehyde. In general molar ratios of between 5:1 and 10:1, preferably about 7:1, gives good results with the minimum of by-products. Moreover by-product formation is reduced by employing a fairly large proportion of water in the reaction mixture. An acetone:water volume ratio of about 2:1 gives good results and there does not apepar to be any advantage in increasing the proportion of water above this, but smaller proportions of water lead to increased formation of mesityl oxide and high boiling substances.

The alkali metal hydroxide concentration within the above range is not critical and about 0.02% by weight based on the weight of the acetone plus the water is the preferred concentration. With these low alkali concentrations it is particularly necessary to allow for any acidity of the reactants, particularly the acetaldehyde. If, therefore, the acetaldehyde is being added gradually to the aqueous acetone, for instance over a period of about 1 hour, a feed of aqueous alkali metal hydroxide solution should be provided in order to maintain the alkali concentration of the reaction mixture at the required level. Too low an alkalinity causes loss of aldehyde and therefore low yields of ethylidene acetone based on the acetaldehyde fed. Any alkali metal hydroxide may be used, preferably sodium hydroxide.

It is preferred to carry out the process by admitting the acetaldehyde below the surface of an agitated mixture of acetone, water and alkali and to maintain an inert atmosphere over the reaction mixture. Under the preferred conditions the reaction time for the condensation step is of the order of 1½ hours after which time the alkaline catalyst should be neutralised and acid added for the dehydration stage. The acid, for instance sulphuric acid, is preferably added before removal of unreacted acetone, for instance by distillation. The dehydration reaction then occurs during the distillation stages for the recovery of the reaction products. Other acids such as phosphoric acid may be used to affect the dehydration but are not as rapid in their action as sulphuric acid. Whichever acid is used the concentration should be limited so that undue resinification during the distillation is avoided.

The following examples set out in the table illustrate the invention. In each example the acetone, water and alkali are heated together in the reactor and the acetaldehyde then run slowly in under the liquid surface over a period of 1–1½ hours while stirring the mixture and maintaining an atmosphere of nitrogen over the reactants. When all the acetaldehyde has reacted, the reaction product is neutralised with the required amount of solid oxalic acid or dilute aqueous sulhpuric acid and then a further quantity of 50% by weight sulphuric acid added as a dehydration catalyst. The product is then fractionally distilled and the fractions analysed using unsaturation determinations and infra-red analyses. In those cases where the alkali content of the reaction mixture is given as a single value of 0.02 or 0.01% additional 0.2 N.NaOH is run in during the addition of acetaldehyde in order to keep the alkalinity at the stated level.

| Example | Mol. Ratio, Acetone to Acetaldehyde | Vol. Ratio, Acetone to Water | Reaction Temp., °C | Alkali Content, percent w./w. NaOH on Acetone+Water | Percent Yield Ethylidene Acetone | | Percent Yield Mesityl Oxide on Acetone | Percent High Boilers on Acetone plus Aldehyde, percent w./w. |
|---|---|---|---|---|---|---|---|---|
| | | | | | On Acetone | On Aldehyde | | |
| 1a | 7:1 | 1:1 | 50/55 | 0.04 | 62.8 | 71.2 | 14.8 | 10.3 |
| 1b | 7:1 | 1:1 | 50/55 | 0.04 | 61.5 | 67.2 | 17.2 | 4.6 |
| 2a | 7:1 | 2:1 | 50/55 | 0.04-0.01 | 71.2 | 58.2 | 20.0 | 7.0 |
| 2b | 7:1 | 2:1 | 50/55 | 0.04 | 60.5 | 63.0 | 14.8 | 6.5 |
| 3 | 7:1 | 2:1 | 50/55 | 0.02 | 67.2 | 79.7 | 12.6 | 6.8 |
| 4 | 5:1 | 2:1 | 50/55 | 0.02-0.01 | 68.5 | 61.0 | 14.8 | 14.7 |
| 5 | 7:1 | 2:1 | 50/55 | 0.01 | 60.5 | 72.0 | 13.8 | 10.9 |
| 6 | 7:1 | 2:1 | 50/55 | 0.04 | 60.5 | 74.7 | 16.6 | 10.1 |

KOH may be used in place of the NaOH and the dehydration may be carried out with phosphoric acid instead of sulphuric acid if desired without substantially affecting the results.

The following run shows the yield obtained when using the low temperatures and comparatively high alkali concentration normally employed in this reaction:

To the agitated mixture of acetone (750 parts by volume), water (325 aprts by volume), N/1 sodium hydroxide solution (50 parts by volume) acetaldehyde (230 parts by weight) is added over 0.5 hour keeping the temperature at 15-20° C. After stirring for a further 3 hours, N/1 sulphuric acid (50 parts by volume) is added and the unconverted acetone distilled off. 50% sulphuric acid (10 parts by weight) is then added and the ethylidene acetone-water azeotrope distilled. The yield of ethylidene acetone is 55% acetaldehyde and 45% on acetone. The crude product analyses as:

|  | Percent |
|---|---|
| Ethylidene acetone | 62 |
| Mesityl oxide | 15 |
| Water | 13 |
| Acetone, etc. | 10 |

We claim:

1. In the process for the production of ethylidene acetone by the alkali metal hydroxide-catalysed condensation of acetaldehyde and acetone under aqueous conditions and the subsequent acid-catalysed dehydration of the hydracetyl acetone so produced, the improvement which consists in carrying out the condensation reaction in an inert atmosphere at a temperature between 40° and 60° C. by gradually adding the acetaldehyde and an aqueous alkali metal hydroxide solution to an aqueous acetone solution of the alkali metal hydroxide, the acetaldehyde being admitted below the surface of the mixture of acetone, water and alkali metal hydroxide and while agitating such mixture, the alkali metal hydroxide content of the reaction mixture being maintained at 0.005% to 0.05% by weight based on the weight of the acetone plus the water, the molar ratio of the acetone to the acetaldehyde being maintained at between 5:1 and 10:1, and the volume ratio of acetone to water being about 2:1.

2. A process which comprises heating a mixture of 1 volume of acetone, at least half a volume of water, and 0.01% to 0.04% by weight of sodium hydroxide based on the weight of the acetone plus the water, to a temperature in the range 50° to 55° C. adding below the liquid surface a stream of acetaldehyde in an amount of 1/7 to 1/5 mole per mole of acetone over a period of 1 to 1½ hours, agitating the mixture and maintaining an inert atmosphere over the reactants, neutralising the reaction mixture after the acetaldehyde has reacted, and thereafter dehydrating the hydracetyl acetone so produced and recovering the ethylidene acetone.

References Cited in the file of this patent

UNITED STATES PATENTS

| 2,378,988 | Dreyfus et al. | June 26, 1945 |
| 2,395,414 | Lincoln et al. | Feb. 26, 1946 |